United States Patent [19]
Miselem

[11] 3,933,449
[45] Jan. 20, 1976

[54] MEANS FOR SEPARATION AND DRAINAGE OF LIQUID FROM A POINT BETWEEN SUCCESSIVE STAGES OF STEAM UTILIZATION

[76] Inventor: Abraham C. Miselem, Pachuca No. 87-102, Mexico, D.F., Mexico

[22] Filed: July 15, 1974

[21] Appl. No.: 488,418

[52] U.S. Cl. .................... 55/218; 55/455; 55/466; 55/DIG. 22; 55/DIG. 23; 137/185
[51] Int. Cl.² ......................................... B01D 45/12
[58] Field of Search .......................... 55/455–457, 55/218, 466, DIG. 22, DIG. 23; 137/185

[56] References Cited
UNITED STATES PATENTS

| | | | |
|---|---|---|---|
| 1,725,712 | 8/1929 | Hawley | 55/455 |
| 1,896,897 | 2/1933 | Hawley | 55/DIG. 22 |
| 1,995,075 | 3/1935 | Murphy | 55/218 |
| 2,276,201 | 3/1942 | Kaye | 137/185 |
| 2,925,884 | 2/1960 | Campbell | 55/455 |
| 3,209,731 | 10/1965 | Schonberger et al. | 55/342 |

*Primary Examiner*—Bernard Nozick
*Attorney, Agent, or Firm*—Hopgood, Calimafde, Kalil Blaustein & Lieberman

[57] ABSTRACT

The apparatus includes a steam separator between two successive stages of steam utilization that condensate liquid is automatically extracted with negligible impediment to high-velocity passage, to the second stage. The separator separates the liquid component by centrifugal action, into a region outside the region of gas discharge to the second stage, and an inverted-bucket steam trap is the means of continuously draining the separated condensate.

8 Claims, 3 Drawing Figures

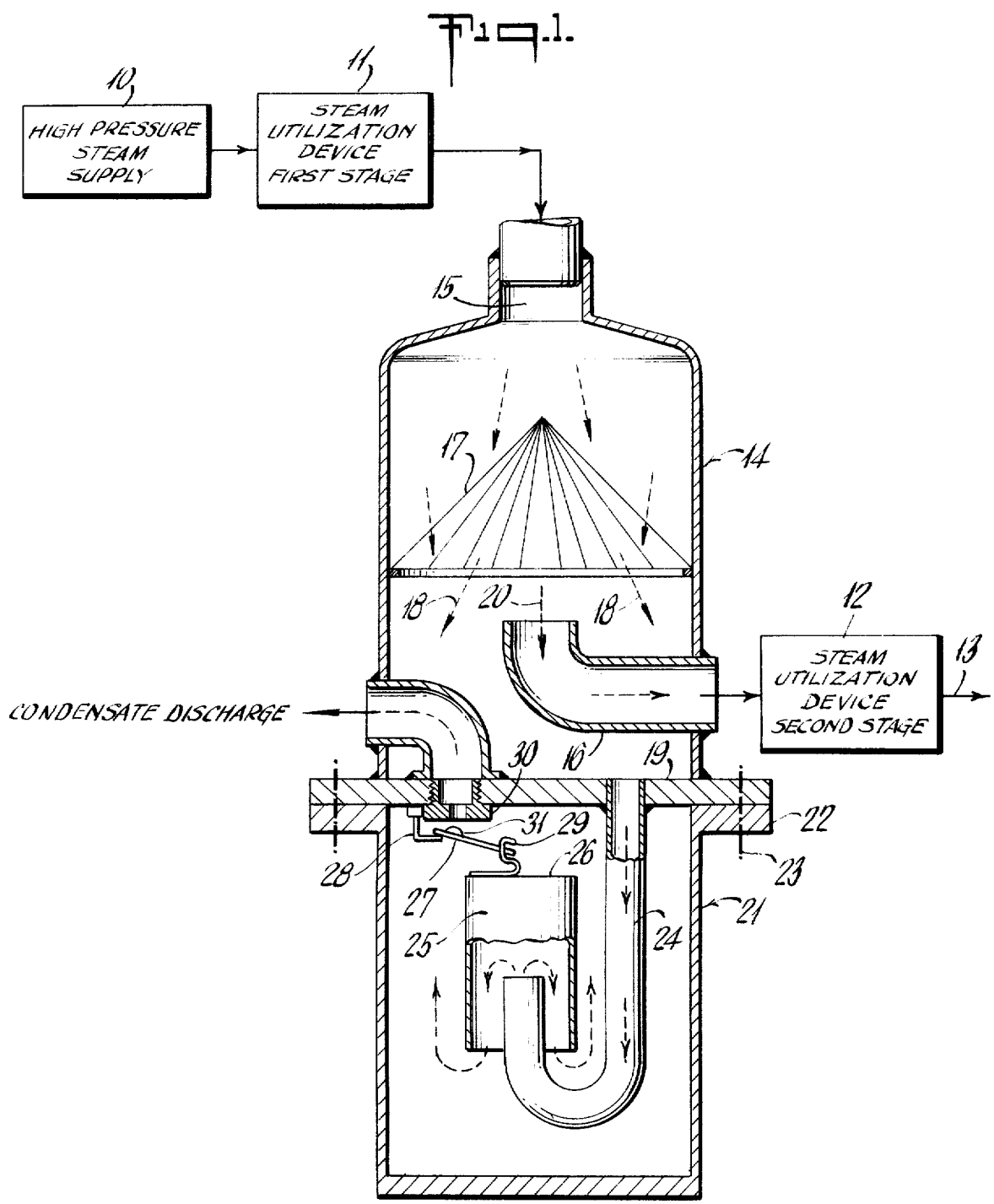

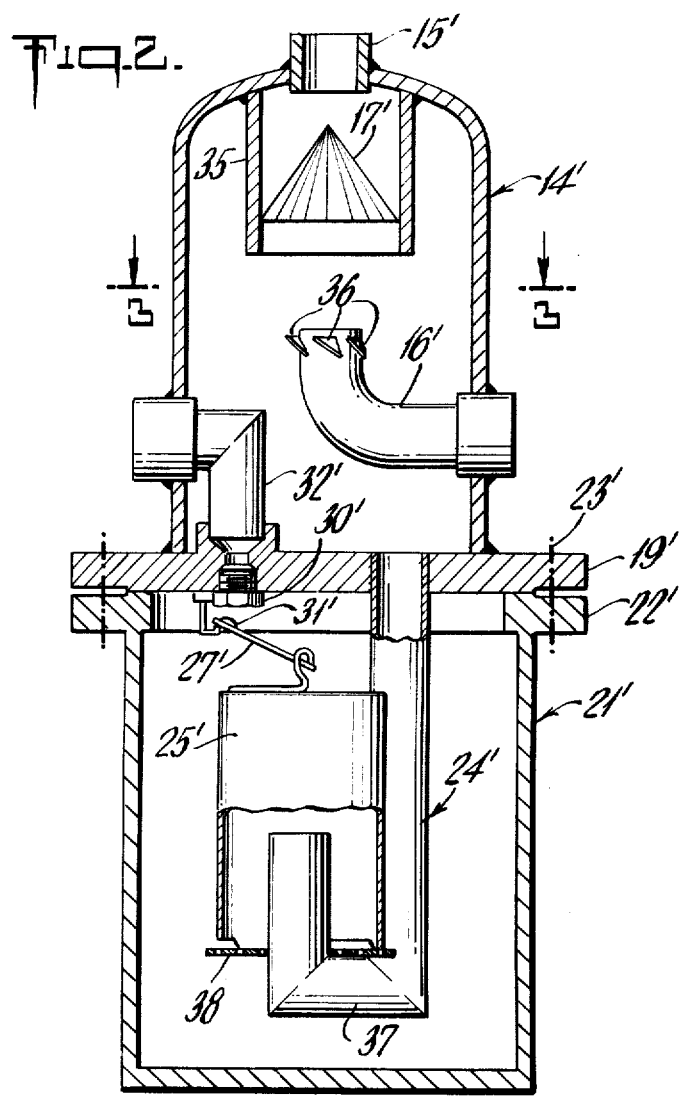
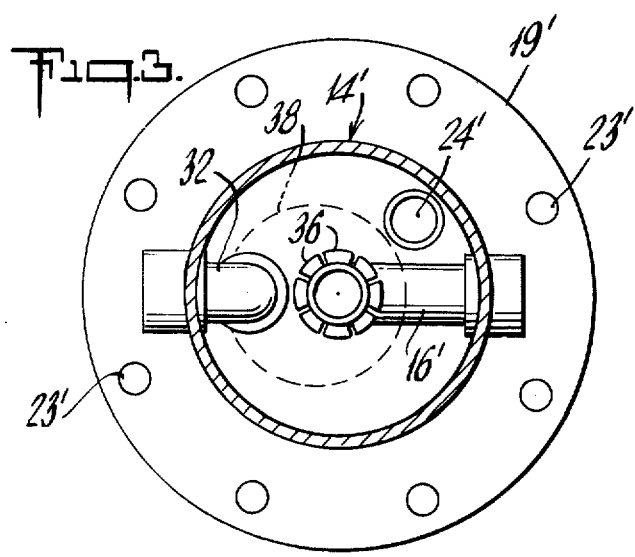

MEANS FOR SEPARATION AND DRAINAGE OF LIQUID FROM A POINT BETWEEN SUCCESSIVE STAGES OF STEAM UTILIZATION

This invention relates to the extraction of liquid from the exhaust products of a first stage of steam utilization, so that the remaining dry steam and other components may be directly supplied to a second and succeeding stage of steam utilization.

In steam-utilization devices such as sugar evaporators, wood-pulp driers and like heaters, the relatively low flow rates which are customary are conducive to air adherence to the heating surface, and therefore accumulation within the heater, thereby considerably and unduly reducing the heat-transfer rate and impairing the efficiency and utility of the heater. A syphon pickup to a steam trap is the conventional means of disposing of accumulated condensate within the heater, but such a technique cannot deal effectively with the problem of accumulated non-condensible gas, such as air.

It is, accordingly, an object of the invention to provide an improved technique and apparatus for dealing with the indicated problem.

It is a specific object to provide means whereby high-velocity steam flows can be relied upon to create turbulence and thus to scavenge non-condensible gas components from a steam-utilization device such as a heater.

Another specific object is to provide means whereby the high-velocity exhaust discharge of such a steam-utilization device may be purged or substantially purged of its liquid-condensate component, so that similar scrubbing or air-scavenging action may characterize further use of the same steam in a succeeding stage of steam utilization.

A further specific object is to provide means whereby liquid condensate may be effectively drained from a continuous high-velocity flow of steam, between successive stages of steam utilization.

It is a general object to meet the above objects with structure of basic simplicity, reliability and effectiveness, such structure lending itself to ready installation and maintenance, and constituting negligible impedance to such variation in flow as may be desired in the downstream stage of steam utilization.

Other objects and various further features of novelty and invention will be pointed out or will occur to those skilled in the art from a reading of the following specification in conjunction with the accompanying drawings. In said drawings, which show, for illustrative purposes only, preferred forms of the invention:

FIG. 1 is a simplified vertical sectional view through a combined trap and separator of the invention, schematically shown in its connection between two successive stages of steam utilization;

FIG. 2 is a similar view of a modified construction; and

FIG. 3 is a sectional view taken at 3—3 in FIG. 2.

In FIG. 1, the invention is shown in application to a high-velocity steam system operating from a suitable source 10 of high-pressure steam and involving two successive stages 11-12 of steam utilization, such as heaters, driers, or the like, interconnected by a combined gas trap and liquid separator. The stages 11-12 may be but two successive stages of a larger plurality; and the indicated combined trap and separator is preferably provided in such quantity as can serve the interconnection of each successive pair of stages, it being understood that the exhaust designation 13 for the second stage 12 may be suggestive of such interconnection of a subsequent stage or stages. The reason for preferring such a succession of stages is to enable high-velocity flow through all stages, so as to assure against local accumulation of non-condensible gases in any single stage of the system.

Basically, the interstage connection device relies upon velocity of first-stage exhaust products to locally react with internal formations in a separating chamber 14 such that the condensate component of this exhaust will tend to locally stratify or separate or concentrate in a first zone, in contrast to local predominance of dry gases (live steam and non-condensibles, such as air) at a second zone, the second zone being used for pickup of dry gases supplied at high velocity to the next succeeding utilization stage 12. In the form shown, the separating chamber 14 is cylindrical and on an upstanding axis coincident with the axis of inlet flow at an inlet connection 15. Gaseous components of separation are picked up from a central zone, by the upstream-directed open end of an elbow or conduit member 16, shown welded to part of the chamber wall for horizontal discharge connection to the inlet of second stage 12. Also as shown, a conical assembly 17 of angularly spaced deflector blades is interposed between the inlet 15 and outlet 16, being fixedly supported by the cylindrical chamber wall; the axis of the blade assembly 17 is preferably coincident with those of inlet 15, of the intake end of outlet 16, and of the chamber 14. It will be understood that the action of blade assembly 17 upon the indicated high-velocity flow is such as to impart a continuous swirl about the chamber axis, with the heavier or condensate components being radially outwardly propelled to an outer zone by centrifugal force, as suggested by the dashed arrows 18. Condensate droplets thus are intercepted by and run down the interior wall surface of chamber 14, being collected upon the bottom wall plate 19 which closes chamber 14. Meanwhile, the remaining components of the flow are relatively dry and are picked up by means 16 for next-stage utilization, as suggested by arrow 20.

In accordance with a feature of the invention, the collected condensate at the bottom of the separator chamber 14 is subjected to continuous drainage via a steam trap which is preferably of the inverted-bucket variety. As shown, all operative parts of the steam trap are carried by the bottom plate 19 of the separator chamber and are contained within a cup-shaped trap housing 21 having a radial flange 22 for removable fit to the plate 19, as suggested by the dashed lines 23 indicative of bolt-circle alignment to secure housing 21 to chamber 14. Thus, the long arm of a J-shaped pipe 24 is secured to plate 19 at a drainage port, and its short arm is positioned for upward discharge within the inner volume of an inverted bucket 25, having a small venting orifice 26 in its closed upper end wall. Bucket 25 is suspended by a swing arm 27 which pivotally connects a fixed bracket 28 on plate 19 to a bracket 29 on the closed end of bucket 26. Plate 19 also is fitted with a valve seat 30 for coaction with a valve member 31 on arm 27, and a conduit or elbow 32 at a bottom corner of chamber 14 provides for lateral discharge of such condensate as is passed by valve means 30–31. The arrangement is such that drain pipe 24 discharges into the inner volume of bucket 25 at all times, regardless of bucket elevation, or of the open or closed condition of valve means 30–31.

In operation, the mixture of gases and condensate exhausting as from a first-stage heating equipment 11, enters the upper part of the separating chamber 14. The velocity of flow of the entering mixture of condensate and gases, in the direction opposite to the vertex of the hollow cone 17 and over its tangentially located blades, produces a centrifugal effect, causing the mixture to rotate on its own directional axis, driving the liquid component to the walls and bottom of the chamber. From there, the collected liquid, through drain tube 24, is discharged inside the inverted bucket 25, which with its bleed 26, lever mechanism 27, and valve means 30–31 is used to differentiate by density, between a vapor and a liquid; the liquid that enters the inverted bucket is discharged through the valve seat 30, to the outlet 32. Simultaneously, the vapors and gases in the upper chamber, which are not affected by the centrifugal force of the separating element, are discharged through the spaces between the blades of the cone 17, to and via elbow 16 to the second stage 12 of steam utilization. When gases fill the bucket at a rate greater than the small bleed flow provided by orifice 26, the bucket becomes buoyant, and through the lever mechanism 27, closes the valve seat 30, thus preventing the gases from escaping through the condensate-discharge outlet 32.

The modification of FIGS. 2 and 3 will be recognized for its correspondence to what has been described in connection with FIG. 1; for this reason, corresponding parts in FIGS. 2 and 3 are given the same reference numbers as in FIG. 1, with primed notation.

In FIGS. 2 and 3, the volumetric flow capacity of the inlet accommodation 15' and of the dry-gas outlet 16' are again of the same order of magnitude. Swirl action is enhanced by mounting the conical deflector-plate assembly 17' within a short nipple or passage 35 which receives and contains the full flow via inlet 15'. Further deflector blades 36 surrounding the intake end of conduit 16' impart added momentum to the swirl, as it is developed in the larger-diameter region of chamber 14', downstream of the blade cone 17' and of nipple 35. Substantial stored energy in the rotating flow is thus productive of strong centrifugal action on the liquid, with resultant delivery of assuredly dry gaseous components via conduit 16'. Collected liquid at the bottom of chamber 14' is drained by a J-shaped tube 24', shown built-up from three miter-connected straight sections of tubing, whereby the lower section 37 is horizontal and serves to orient means such as a perforated plate 38 for support of a bottom position of the inverted bucket 25'. FIG. 3 indicates a preference that the long arm or section of the drain conduit 24' shall be offset laterally to one side of the path of movement of bucket 25', thus avoiding mechanical interference and providing a means for economizing the use of housing material, at 14' and 21'.

It will be seen that the described structure and its connections meet all stated objects. In particular, the invention makes possible a great improvement in efficiency of heat transfer, for every stage of the system, because it draws off continuously and at high velocity more air and other non-condensable gases than any other device known to me, all due to the turbulent scrubbing action that is possible with a high-velocity system. Moreover, the high flow velocity permits highly efficient liquid separation and drainage, without loss of steam. Still further, a high-velocity system of the character indicated enables rapid purge of all air within the system, as upon a start-up of steam supply at 10. And by so selecting the conical blade assembly 17 (17') such that the total gas-passage area between swirl-inducing blades is greater than the effective area of either of the inlet or outlet connections 15 (15') or 16 (16'), one is assured of negligible pressure drop between stages 11–12 and, therefore, relatively great accommodation to such velocity changes as may be dictated by the particular utilization that is made at any given stage or stages.

While the invention has been described in detail for the preferred forms shown, it will be understood that modifications may be made without departing from the scope of the invention.

What is claimed is:

1. A steam-utilization system, comprising a single supply of high-pressure steam and two successive stages of steam utilization, said first stage having an input connected to said supply and an output connection for continuously exhausting from said first stage a combined flow of steam and condensate and such other noncondensable products as may be contained therein, said second stage having an input connection of substantially the same volumetric flow-rate capacity as the output connection of said first stage, a separator chamber having an inlet and an outlet respectively connected to said first-stage output and to said second-stage input, said chamber including a generally conical array of swirl-inducing blades on an upstanding axis and effectively dividing the interior of said chamber into an upper region and a lower region, the chamber inlet being into the upper region and the chamber outlet comprising outletconduit means with an open end located within and above the bottom of the lower region, said open end being radially spaced from the chamber wall and facing said array, whereby a substantial fraction of the condensate content of the first-stage exhaust is collected at the bottom of the lower region without admission to said second-stage input connection, a condensate-drain outlet connection from the region of condensate collection in said chamber, and condensate-discharge means including an inverted-bucket steam trap, said drain outlet connection being positioned to discharge into the space within the inverted bucket of said trap.

2. A combined gas trap and liquid separator, comprising an upper gas-chamber body and a lower liquid-trap-chamber body removably carried by and beneath said gas-chamber body, said gas-chamber body having an upper inlet port for admission of a flow of liquid-gas mixture, flow-deflector means comprising a generally conical array of swirl-inducing blades carried within said gas-chamber body and effectively dividing the interior of said gas-chamber body into an upper inlet region and a lower discharge region, thereby imparting to the inlet flow of admitted mixture a rotary swirl about a central axis of flow, and thereby also centrifugally directing to an outer zone of greatest radii about said axis the liquid component of the mixture, a gas-outlet port including a conduit having an open inlet end above the bottom of the lower region and facing the flow discharged by said deflector means, said open end having an area confined to a central zone of lesser radii about said axis, trap means including an inverted bucket movably suspended within said trap-chamber body, and a liquid drain conduit extending from the outer zone of said gas-chamber body and positioned to discharge into the interior of said inverted bucket, said trap means including valve-controlled means discharging external to said bodies and having an operating connection to a movable part of the bucket suspension.

3. The gas trap and liquid separator of claim 2, in which the inlet to the gas-outlet conduit is at an elevation above the connection of said drain conduit to said gas-chamber body.

4. The gas trap and liquid separator of claim 2, wherein the elevation of drain-conduit discharge into the inverted bucket is such as to be within the inner volume of the bucket for all possible bucket elevations determined by said suspension.

5. The gas trap and liquid separator of claim 2, wherein the effective sectional area of said inlet port and of said gas-outlet port are of the same general order of magnitude.

6. The gas trap and liquid separator of claim 2, in which said drain conduit is generally J-shaped and contained within said trap-chamber body, the long arm of the J-shape being connected to and supported by the bottom of the gaschamber body and being offset from the path of movement of the inverted bucket as determined by said suspension.

7. The gas trap and liquid separator of claim 6, in which bucket-support means is carried by a lower part of said J-shaped drain conduit, being so located in elevation as to support said bucket in a predetermined lowermost location in the path of movement determined by said suspension.

8. A combined gas trap and liquid separator comprising an upstanding generally cylindrical gas-chamber body having an inlet-chamber region and a discharge-chamber region separated by a generally conical array of swirl-inducing blades on an upstanding axis, an inlet connection to said inlet-chamber region for admitting a flow of liquid-gas mixture thereto, a gas-outlet connection to said discharge-chamber region and including a conduit with an open inlet end of area substantially less than that of said gas-chamber body and facing the axis of discharge of said array and located above the bottom of said gas-chamber body, a cupped trap housing removably secured at its open end to the bottom of said gas-chamber body, trap means including an inverted bucket movably suspended in the volume within said trap housing, a drain conduit extending from and through the bottom of said gas-chamber body into the included volume of said trap housing, said drain conduit being positioned to discharge into the inner volume of said inverted bucket, and trap-discharge passage means extending upwardly through the gas-chamber bottom and forming part of an external liquid-discharge connection to the gas-chamber body, said trap means including a valve in said trap-discharge passage means and operated by a movable part of the bucket suspension, whereby said trap housing may be removed without disturbing any of said connections.

* * * * *